United States Patent Office.

JAMES HOGBEN, OF CLEVELAND, OHIO.

Letters Patent No. 96,321, dated November 2, 1869.

IMPROVED BLUING-COMPOUND FOR THE MANUFACTURE OF PAPER.

The Schedule referred to in these Letters Patent and making part of the same.

I, JAMES HOGBEN, of Cleveland, in the county of Cuyahoga, and State of Ohio, have invented certain Improvements in Bluing-Compound in the Manufacture of Paper, of which the following is a specification.

Objective.

The nature of my invention relates to the combination of aniline or other suitable red pigment with sulphate of iron, prussiate of potassa, and sulphuric acid, for the purpose of giving the desired tint or color to paper in the process of its manufacture.

Description.

The said compound consists of the following ingredients and propositions, or their essential equivalents, viz, sulphate of iron, sixteen pounds; prussiate of potassa, eight pounds; sulphuric acid, eight pounds; red aniline, two ounces; making altogether thirty-two pounds two ounces.

Pulverize the sulphate of iron (green is preferred) and the prussiate of potash, and add the sulphuric acid. Mix it in a glass or stone vessel, then let it remain until digested or assumes a pasty condition.

Dissolve the aniline in sulphuric acid, (one ounce) or sufficient to liquefy the same. Add this to the compound of sulphate of iron, prussiate of potassa, and sulphuric acid aforesaid. Then mix the entire mass thoroughly, dry, and grind the same to a powder.

Previous to drying and grinding, in order to guard against any free acid that may remain in the compound, add one gallon of clear solution of caustic lime. An insoluble sulphate of lime will be formed, if any free acid remains, which sulphate of lime will not injure the paper.

The relative proportions may be altered and produce the same results, without changing the nature of the invention; and I do not confine myself to the use of red aniline, but employ any suitable red pigment in place thereof that will produce the same results.

The compound or preparation, without the aniline, may be used first with the pulp, and the aniline or red pigment subsequently added, while the pulp is in the engine or beaters, but allowing sufficient time for the preparation to be dissolved so completely as to leave no specks or spots upon the paper.

Claim.

What I claim as my invention, and desire to secure by Letters Patent, is—

The herein-described compound, prepared and used substantially as and for the purpose set forth.

JAMES HOGBEN.

Witnesses:
W. H. BURRIDGE,
J. H. BURRIDGE.